US012792124B2

(12) United States Patent
Banzal et al.

(10) Patent No.: US 12,792,124 B2
(45) Date of Patent: Nov. 10, 2026

(54) POWER SUPPLY SELECTION

(71) Applicant: STMicroelectronics International N.V., Geneva (CH)

(72) Inventors: Sourabh Banzal, Noida (IN); Nicolas Bernard Grossier, Oreno di Vimercate (IT); Venkata Narayanan Srinivasan, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 101 days.

(21) Appl. No.: 18/680,641

(22) Filed: May 31, 2024

(65) Prior Publication Data

US 2025/0370529 A1 Dec. 4, 2025

(51) Int. Cl.
*G06F 1/3209* (2019.01)
*G06F 1/26* (2006.01)

(52) U.S. Cl.
CPC ............ *G06F 1/3209* (2013.01); *G06F 1/263* (2013.01)

(58) Field of Classification Search
CPC ... G06F 1/24; G06F 1/263; G06F 1/28; G06F 1/30; G06F 1/3203; G06F 1/3209; G06F 1/3287
USPC ........................................................ 361/90
See application file for complete search history.

(56) References Cited

U.S. PATENT DOCUMENTS 5,481,680 A * 1/1996 Larson .................. G06F 13/364 710/112
8,159,263 B1 4/2012 Tuan
8,230,239 B2 7/2012 Wang
8,397,090 B2 3/2013 Gunther
9,190,995 B2 11/2015 Chen
9,239,600 B2 1/2016 Pickholz
10,908,667 B2 2/2021 Severino
2005/0077919 A1 4/2005 Sowden
(Continued)

FOREIGN PATENT DOCUMENTS

KR 20220135768 A * 10/2022 ............. G11C 5/147

OTHER PUBLICATIONS

Machine translation of Lee Korean Patent Document KR 20220135768 A Oct. 2022 (Year: 2022).*
(Continued)

*Primary Examiner* — Kevin J Comber
(74) *Attorney, Agent, or Firm* — Slater Matsil, LLP

(57) ABSTRACT

An electronic circuit is disclosed. The circuit includes power voltage monitoring circuits to monitor a main power voltage provided to a first circuit configured to operate in a main power domain, generate a main power domain monitor signal based on the main power voltage, monitor a second power voltage provided to a second circuit to operate in a second power domain, and generate a second power domain monitor signal based on the second power voltage; a non-volatile memory to store data indicating an expected power domain value for the second power domain; a mask register to receive and store data from the non-volatile memory indicating the expected power domain value for the second power domain; and a controller to generate a power status signal for the second power domain based on data of the mask register, the main power domain monitor signal, and the second power domain monitor signal.

20 Claims, 8 Drawing Sheets

(56) References Cited

U.S. PATENT DOCUMENTS

| | | | | |
|---|---|---|---|---|
| 2011/0157956 | A1* | 6/2011 | Rotem | G11C 5/147<br>365/94 |
| 2015/0346001 | A1* | 12/2015 | Tripathi | G01D 9/00<br>702/190 |
| 2016/0127123 | A1* | 5/2016 | Johnson | H04L 9/003<br>713/189 |
| 2017/0054300 | A1* | 2/2017 | Shao | G11C 17/16 |

OTHER PUBLICATIONS

Extended European Search Report, Patent Application No. 25176724.0, mailed Oct. 21, 2025, 10 pages.
Majzoub, S., "Voltage Island Design in Multi-Core SIMD Processors," https://www.researchgate.net/publication/224223332, Conference Paper · Jan. 2011, DOI: 10.1109/IDT.2010.5724399 · Source: IEEE Xplore, 7 pages.

* cited by examiner

POWER SUPPLY SELECTION

TECHNICAL FIELD

The present disclosure generally relates to a power supply selection circuit, as well as to methods for selecting power supplies.

BACKGROUND

Some electronic chips use multiple power supply domains, where one or more power supply domains may operate at a selected voltage. An integrated circuit (IC) receives a power voltage at each of the power supply domains, and an electronic system using the IC interfaces with the IC to communicate to the IC the expected power voltages.

SUMMARY

One embodiment is an electronic circuit, including a plurality of power voltage monitoring circuits configured to monitor a main power voltage provided to a first circuit configured to operate in a main power domain, generate a main power domain monitor signal based on the main power voltage, monitor a second power voltage provided to a second circuit configured to operate in a second power domain, and generate a second power domain monitor signal based on the second power voltage; a non-volatile memory configured to store data indicating an expected power domain value for the second power domain; a mask register configured to receive and store data from the non-volatile memory indicating the expected power domain value for the second power domain; and a controller configured to generate a power status signal for the second power domain based on data of the mask register, the main power domain monitor signal, and the second power domain monitor signal.

Another embodiment is a system, including a main power source, configured to generate a main power voltage; a second power source, configured to generate a second power voltage; and an electronic circuit, including a plurality of power voltage monitoring circuits configured to monitor the main power voltage, the main power voltage being provided to a first circuit configured to operate in a main power domain, generate a main power domain monitor signal based on the main power voltage, monitor the second power voltage, the second power voltage being provided to a second circuit configured to operate in a second power domain, and generate a second power domain monitor signal based on the second power voltage; a non-volatile memory configured to store data indicating an expected power domain value for the second power domain; a mask register configured to receive and store data from the non-volatile memory indicating the expected power domain value for the second power domain; and a controller configured to generate a power status signal for the second power domain based on data of the mask register, the main power domain monitor signal, and the second power domain monitor signal.

Another embodiment is a method of operating a system, the method including in response to data indicating that a first power domain is expected to operate with a first power voltage value determining whether a first power voltage of the first power domain is greater than a predetermined lower limit, and, in response to the first power voltage being greater than the lower limit, generating a signal allowing the first power domain to exit a reset mode; and in response to data indicating that the first power domain is expected to operate with a second power voltage value less than the first power voltage value determining whether the first power voltage of the first power domain is less than a predetermined upper limit, in response to the first power voltage being less than the upper limit, determining whether the first power voltage of the first power domain is greater than the lower limit, and, in response to the first power voltage being greater than the lower limit, generating a signal allowing the first power domain to exit the reset mode.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

Figure 1:
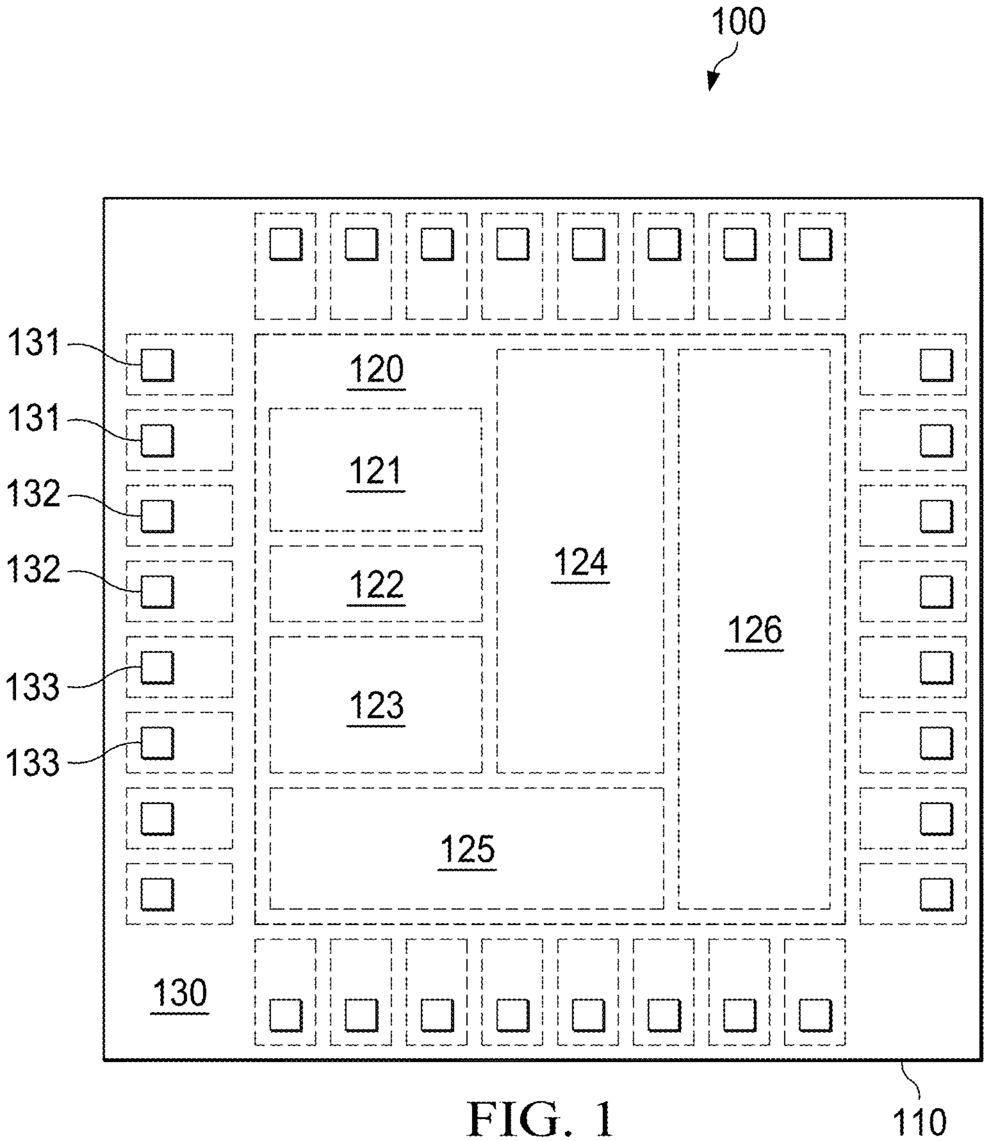
FIG. 1 shows a schematic block diagram of an integrated circuit having one or more power supply domains operable at selected voltages according to some embodiments.

Corresponding numerals and symbols in the different figures generally refer to corresponding parts unless otherwise indicated. The figures are drawn to illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

The embodiments discussed herein illustrate various aspects of power supply domain control systems and methods to, for example, effectively and safely manage power domain control. For example, some embodiments prevent attempted operation before proper power supply voltages are applied to correct power supply domains.

In some embodiments, an integrated circuit may have multiple power domains, each serving a number of circuits integrated, for example, on a single semiconductor die. In some embodiments, an integrated circuit may have multiple power domains, each serving a number of circuits integrated, for example, on one or more semiconductor die of a group of semiconductor die packaged together.

In some embodiments, one or more of the multiple power domains may be configured to operate in a selected one of a number of selectable voltage values. For example, one or more of the multiple power domains may be configured to operate in either of a 1.8 V mode or a 3.3 V mode. In some embodiments, one or more of the multiple power domains of the integrated circuit may be configured function reliably in the 1.8 V mode if the voltage applied thereto is between 1.62 V and 2.1 V. Similarly, in some embodiments, one or more of the multiple power domains of the integrated circuit may be configured function reliably in the 3.3 V mode if the voltage applied thereto is between 2.7 V and 4 V.

In some embodiments, one or more of the multiple power domains may be configured to operate only in the 1.8 V mode. In some embodiments, one or more of the multiple power domains may be configured to operate only in the 3.3 V mode.

The voltages 1.8 V and 3.3 V of the 1.8 V mode and the 3.3 V mode, and the particular acceptable voltage value ranges discussed above are examples only. Other voltage values, and other voltage value ranges may be used.

In addition, the integrated circuit having two voltage modes is also an example. In some embodiments, the integrated circuit has one or more power domains which may operate in any of three, four, five, or more voltage modes.

When used in an electronic system, the integrated circuit receives a power voltage for each of the power domains. In addition, the integrated circuit accesses one or more expected voltage signals indicating an expected power voltage for each of the power domains. In some embodiments, the one or more expected voltage signals are stored on the integrated circuit, for example, in a non-volatile memory. In some embodiments, the one or more expected voltage signals are stored on the integrated circuit in a register program based on data received from the electronic system. If the accessed power voltage for any of the power domains does not match the power voltage value indicated by the expected voltage signals, the integrated circuit may not function properly, or may experience a reliability hazard. For example, if a particular power domain is expected to operate with 1.8 V, but instead receives a 3.3 V power voltage, the transistors of the power domain may be damaged. Alternatively, if a particular power domain is expected to operate with 3.3 V, but instead receives a 1.8 V power voltage, the circuitry of the particular power domain may not function properly.

If the accessed power voltage for any of the power domains does not match the power voltage value indicated by the expected voltage signals, the integrated circuit may be configured to generate an error signal for the electronic system indicating an error. In some embodiments, the error signal provides information indicating various details of the error detected. For example, the error signal may specify a particular power domain, and/or a received voltage for the particular power domain. In some embodiments, in response to the error signal, the integrated circuit is reset. In some embodiments, in response to the error signal, the system or a portion of the system having the integrated circuit is reset.

In some embodiments, the electronic system may be configured to respond to the error signal, for example, by powering down the integrated circuit. In some embodiments, the electronic system may be configured to respond to the error signal for example, by not operating the integrated circuit. In some embodiments, the error signal causes the integrated circuit to remain in a reset mode.

If the accessed power voltages received by all of the power domains does match the power voltage values indicated by the expected voltage signals, the integrated circuit may be configured to generate a good signal indicating that the power configuration is acceptable.

In some embodiments, the electronic system may be configured to respond to the good signal, for example, by using the integrated circuit, for example, in the execution of an application or by providing test signals to the integrated circuit. In some embodiments, the electronic system may be configured to wait for the good signal before using the integrated circuit. In some embodiments, the good signal causes the integrated circuit to exit a reset mode and enter a use or test mode.

In some embodiments, the integrated circuit is configured to generate the good signal and/or the error signal as part of a startup or bootstrapping operation. In some embodiments, the starter or bootstrapping operation does not complete successfully without the integrated circuit generating the good signal.

In some embodiments, the integrated circuit comprises a power status circuit which operates on a main power domain, and generates power status signals for each of a number of other power domains. The power status circuit may include a non-volatile memory configured to store data indicating an expected power status for each power domain. The power status circuit may also include a number of power voltage monitoring circuits configured to monitor power voltages applied to each power domain. The integrated circuit may be configured to generate the power status signals for the other power domains based on the data from the non-volatile memory and the power voltages applied to the other power domains, as determined by the power voltage monitoring circuits.

Because of the functionality of the power status circuit, the integrated circuit is able to determine the power status for each power domain without the use of external package pins, which would otherwise be needed to, for example, determine expected power domain voltages. For example, without the functionality of the power status circuit, one or more pins may be needed to communicate values of voltages for the various power domains. For example, the pins may be dedicated to this communication. Accordingly, in addition to the provided functionality, one additional advantage of certain embodiments is the reduction of package pin count.

FIG. 1 shows a schematic block diagram of an integrated circuit 100 having three or more power supply domains operable at selected voltages according to some embodiments. In this embodiment, integrated circuit 100 is formed on a single die 110. Integrated circuit 100 has a peripheral section 130 and a core section 120. Integrated circuit 100 provides an example having particular features and quantities. Other embodiments have different features and quantities. For example, some embodiments have different numbers of power domains.

Core section 120 includes circuit blocks 121-126. Each of these circuit blocks includes circuits implemented with transistors configured to perform various processing and communication functions relative to the functionality of the integrated circuit 100. Core section 120 also includes wiring connections (not shown) between circuit blocks 121-126. Each of circuit blocks 121-126 receives power from one or more of the power domains. In some embodiments, one or more or all of circuit blocks 121-126 receives power from a corresponding single one of the power domains.

Peripheral section 130 includes electrical connections configured to electrically connect integrated circuit 100 to an electronic system. The electrical connections include electrical connections 131, electrical connections 132, electrical connections 133, and a plurality of other electrical connections (unnumbered).

Electrical connections 131 are configured to electrically connect integrated circuit 100 to a main power domain. In some embodiments, the main power domain is a 3.3 V power domain. In some embodiments, the main power domain is a 1.8 V power domain. In some embodiments, the power voltage of the main power domain is a different value. In some embodiments, the main power domain is for a power voltage which is highest in magnitude of the power voltages of the power domains. For example, in some embodiments, no other power domains have power voltages which are greater than the power voltage of the main power domain. In some embodiments, one or more other power domains have power voltages which are equal to or substantially equal to the power voltage of the main power domain. In some embodiments, one or more other power domains have power voltages which are less than the power voltage of the main power domain. In some embodiments, one or more other power domains have power voltages which are greater than the power voltage of the main power domain.

In some embodiments, electrical connections 131 include a power connection configured to receive a voltage corresponding with the voltage value of the main power domain and include a ground connection configured to be electrically connected to a system ground. In some embodiments, electrical connections 131 include multiple power connections configured to receive the voltage corresponding with the voltage value of the main power domain, and one or more other electrical connections are configured to be electrically connected to the system ground.

Electrical connections 132 are configured to electrically connect integrated circuit 100 to a second power domain. In some embodiments, the second power domain is a 3.3 V power domain. In some embodiments, the second power domain is a 1.8 V power domain. In some embodiments, the power voltage of the second power domain is a different value.

In some embodiments, electrical connections 132 include a power connection configured to receive a voltage corresponding with the voltage value of the second power domain and include a ground connection configured to be electrically connected to a system ground. In some embodiments, electrical connections 132 include multiple power connections configured to receive the voltage corresponding with the voltage value of the second power domain, and one or more other electrical connections are configured to be electrically connected to the system ground.

Electrical connections 133 are configured to electrically connect integrated circuit 100 to a third power domain. In some embodiments, the third power domain is a 3.3 V power domain. In some embodiments, the third power domain is a 1.8 V power domain. In some embodiments, the power voltage of the third power domain is a different value.

In some embodiments, electrical connections 133 include a power connection configured to receive a voltage corresponding with the voltage value of the third power domain and include a ground connection configured to be electrically connected to a system ground. In some embodiments, electrical connections 133 include multiple power connections configured to receive the voltage corresponding with the voltage value of the third power domain, and one or more other electrical connections are configured to be electrically connected to the system ground.

In some embodiments, one or more of the main, second, and third power domains is configured to receive a selectable and changeable power voltage value. For example, one or more of the main, second, and third power domains may be configured to operate in either of a 1.8 V mode or a 3.3 V mode. In some embodiments, one or more of the main, second, and third power domains may be configured to operate only in the 1.8 V mode. In some embodiments, one or more of the main, second, and third power domains may be configured to operate only in the 3.3 V mode.

When used in an electronic system, the integrated circuit 100 may receive a power voltage for each of the power domains. In addition, the integrated circuit accesses one or more expected voltage signals indicating an expected power voltage for each of the main, second, and third power domains.

In some embodiments, circuit block 121 comprises a power status circuit which operates on the main power domain. The power status circuit may be configured to generate power status signals for each of the second and third power domains. The power status circuit may include a non-volatile memory configured to store data indicating an expected power status for the second and third power domains. The power status circuit may also include a number of power voltage monitoring circuits configured to monitor power voltages applied to each power domain. The power status circuit may be configured to generate the power status signals for the second and third power domains based on the data from the non-volatile memory and the power voltages applied to the main, second, and third power domains, as determined by the power voltage monitoring circuits.

If the accessed power voltage for any of the main, second, and third power domains does not match the power voltage value indicated by the expected voltage signals, the power status circuit may be configured to generate an error signal for the electronic system indicating an error and, in some embodiments, details of the error. In some embodiments, the error signal causes the integrated circuit 100 to remain in a reset mode.

If the accessed power voltages received by all of the main, second, and third power domains does match the power voltage values indicated by the expected voltage signals, the power status circuit may be configured to generate a good signal indicating that the power configuration is acceptable. In some embodiments, the good signal causes the integrated circuit 100 to exit a reset mode and enter a use or test mode.

FIGS. 2-5 show a schematic block diagram of integrated circuit 100 having various power supply domain connection arrangements according to some embodiments. In some embodiments, integrated circuit 100 is used in a system and has any particular one of the arrangements shown in FIGS. 2-5. In some embodiments, integrated circuit 100 is used in a system which is configured to switch among two or more of the arrangements shown in FIGS. 2-5.

Figure 2:
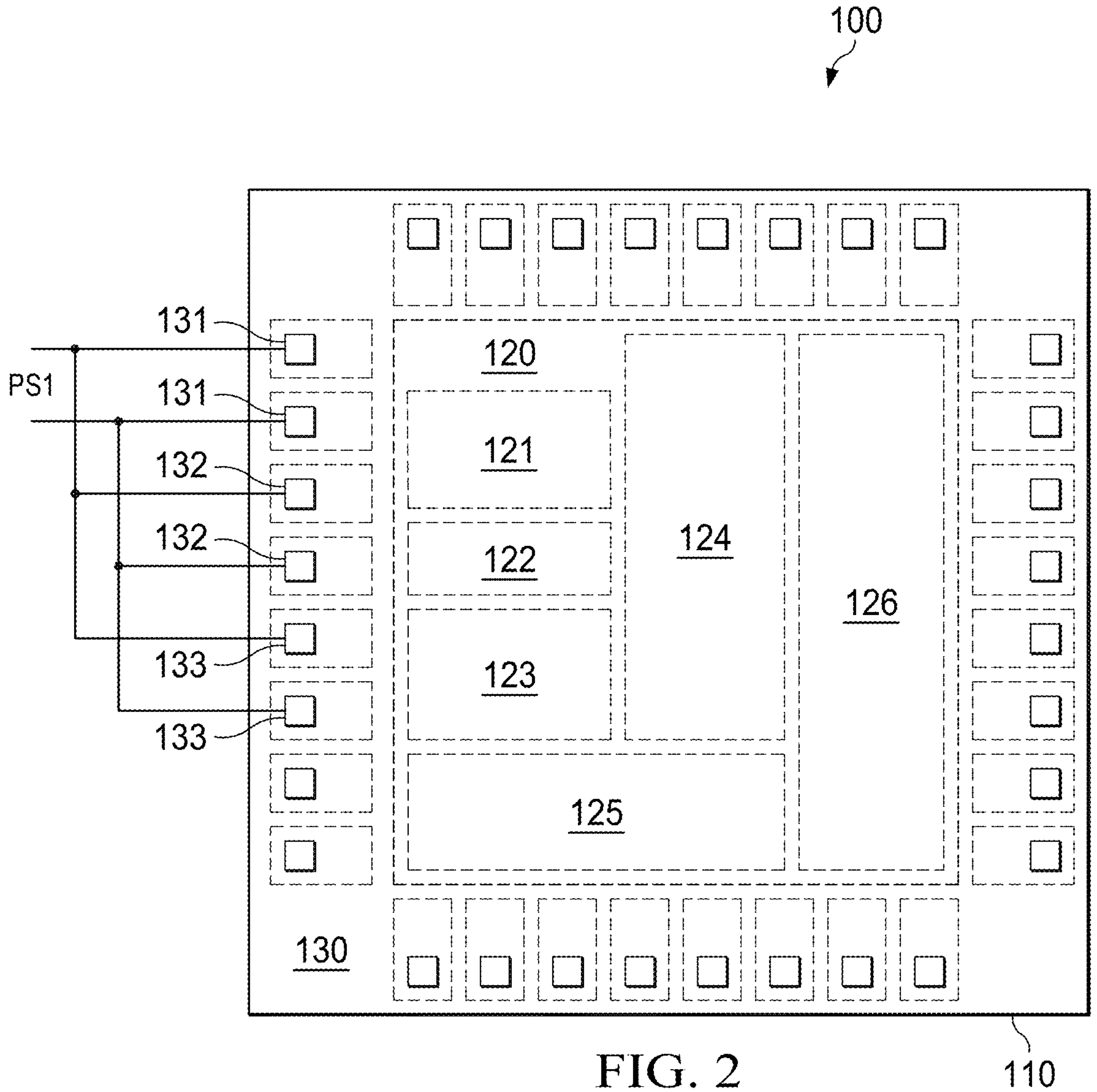
FIG. 2 shows a schematic block diagram of an integrated circuit having one or more power supply domains connected to selected voltages according to some embodiments.

FIG. 2 shows a schematic block diagram of integrated circuit 100 having three power supply domains connected to a selected voltage according to some embodiments.

In the embodiment of FIG. 2, the main power domain, the second power domain, and the third power domain are all connected to a single power voltage supplied by power supply PS1. For example, in this embodiment, the main power domain, the second power domain, and the third power domain may be configured to operate with a 3.3 V power supply, a 1.8 V power supply, or a power supply having a different voltage value.

Figure 3:
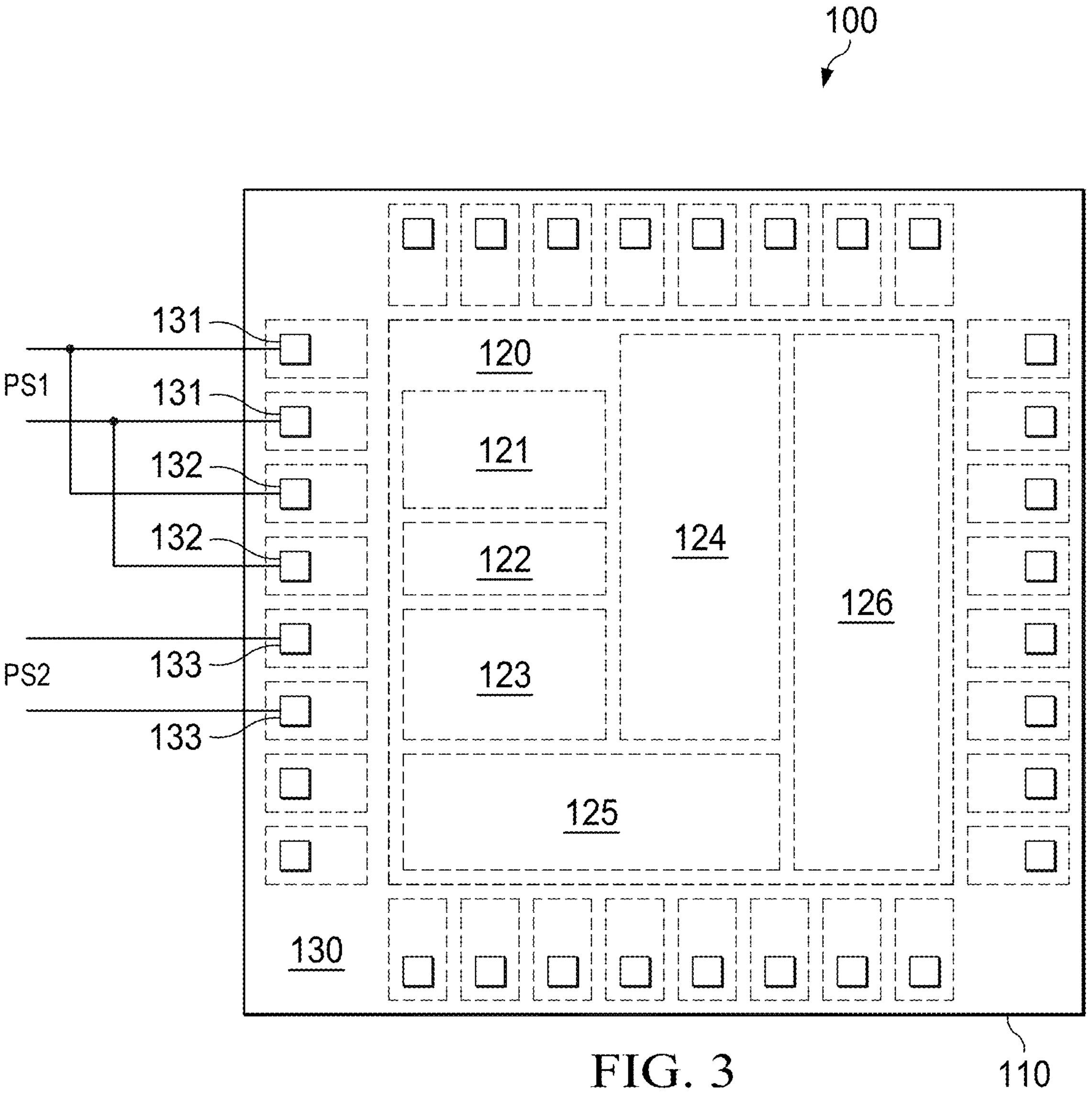
FIG. 3 shows a schematic block diagram of an integrated circuit having one or more power supply domains connected to selected voltages according to some embodiments.

FIG. 3 shows a schematic block diagram of integrated circuit 100 having three power supply domains connected to selected voltages according to some embodiments.

In the embodiment of FIG. 3, the main power domain and the second power domain are connected to a single power voltage supplied by power supply PS1. For example, in this embodiment, the main power domain and the second power domain may be configured to operate with a 3.3 V power supply, a 1.8 V power supply, or a power supply having a different voltage value.

In addition, in the embodiment of FIG. 3, the third power domain is connected to a power voltage supplied by power supply PS2. In this embodiment, the third power domain may be configured to operate with a 3.3 V power supply, a 1.8 V power supply, or a power supply having a different voltage value. In some embodiments, the power voltage supplied by power supply PS1 is different from the power voltage supplied by power supply PS2. In some embodiments, the power voltage supplied by power supply PS1 is the same as the power voltage supplied by power supply PS2.

Figure 4:
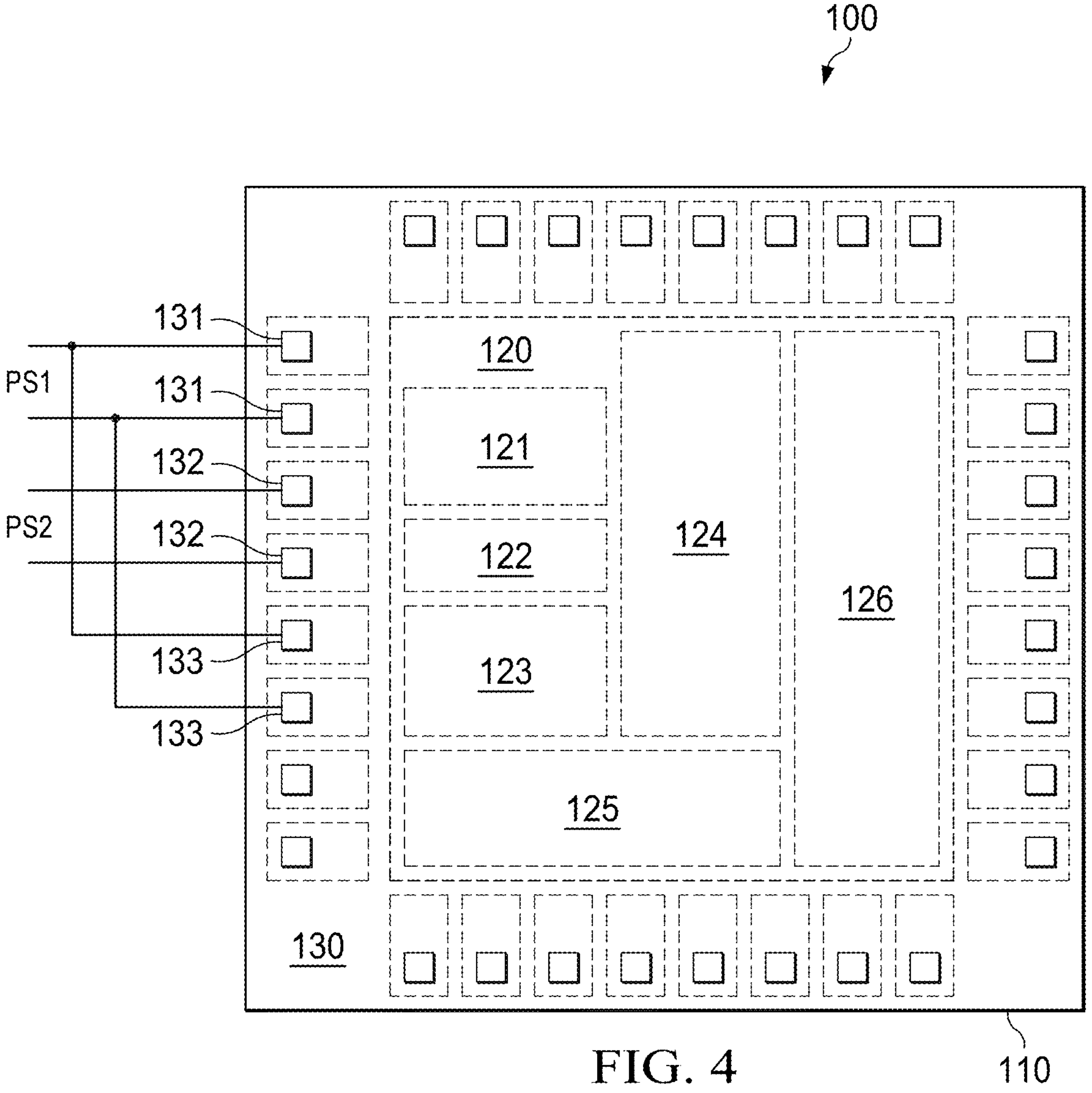
FIG. 4 shows a schematic block diagram of an integrated circuit having one or more power supply domains connected to selected voltages according to some embodiments.

FIG. 4 shows a schematic block diagram of integrated circuit 100 having three power supply domains connected to selected voltages according to some embodiments.

In the embodiment of FIG. 4, the main power domain and the third power domain are connected to a single power voltage supplied by power supply PS1. For example, in this embodiment, the main power domain and the third power domain may be configured to operate with a 3.3 V power supply, a 1.8 V power supply, or a power supply having a different voltage value.

In addition, in the embodiment of FIG. 4, the second power domain is connected to a power voltage supplied by power supply PS2. In this embodiment, the second power domain may be configured to operate with a 3.3 V power supply, a 1.8 V power supply, or a power supply having a different voltage value. In some embodiments, the power voltage supplied by power supply PS1 is different from the power voltage supplied by power supply PS2. In some embodiments, the power voltage supplied by power supply PS1 is the same as the power voltage supplied by power supply PS2.

Figure 5:
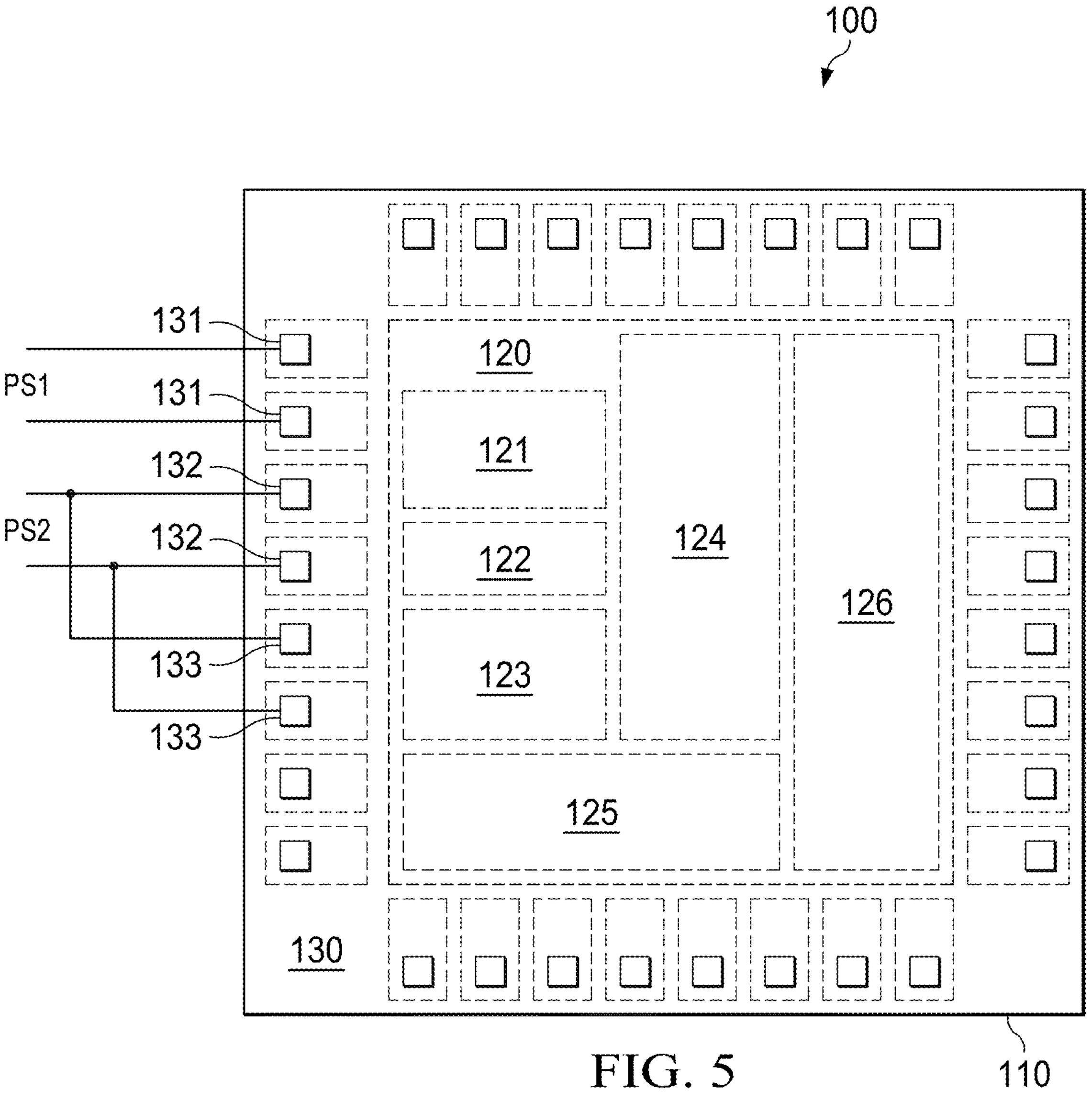
FIG. 5 shows a schematic block diagram of an integrated circuit having one or more power supply domains connected to selected voltages according to some embodiments.

FIG. 5 shows a schematic block diagram of integrated circuit 100 having three power supply domains connected to selected voltages according to some embodiments.

In the embodiment of FIG. 5, the main power domain is connected to a power voltage supplied by power supply PS1. For example, in this embodiment, the main power domain may be configured to operate with a 3.3 V power supply, a 1.8 V power supply, or a power supply having a different voltage value.

In addition, in the embodiment of FIG. 5, the second power domain and the third power domain are connected to a power voltage supplied by power supply PS2. In this embodiment, the second power domain and the third power domain may be configured to operate with a 3.3 V power supply, a 1.8 V power supply, or a power supply having a different voltage value. In some embodiments, the power voltage supplied by power supply PS1 is different from the power voltage supplied by power supply PS2. In some embodiments, the power voltage supplied by power supply PS1 is the same as the power voltage supplied by power supply PS2.

Figure 6:
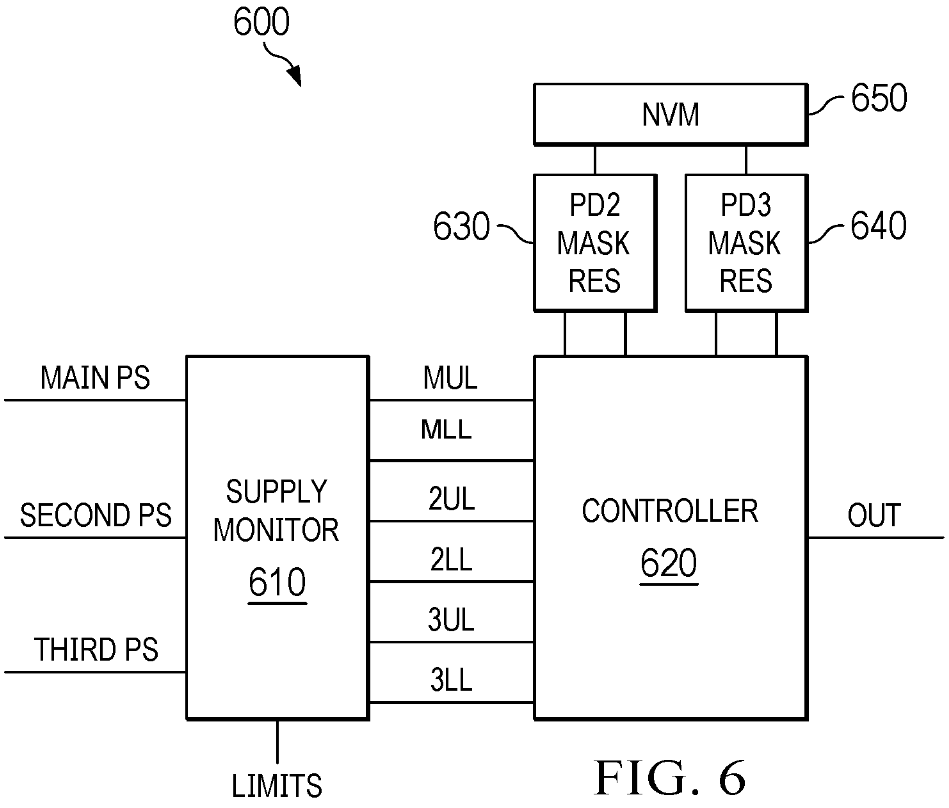
FIG. 6 shows a schematic block diagram of a power status circuit according to some embodiments.

FIG. 6 shows a schematic block diagram of a power status circuit 600 according to some embodiments. In some embodiments, power status circuit 600 may be used as the power status circuit of circuit block 121 of integrated circuit 100. Power status circuit 600 includes supply monitor 610, controller 620, second power domain mask register 630, third power domain mask register 640, and non-volatile memory 650.

Supply monitor 610 includes a number of comparator circuits configured to sense the voltage supply values of the main power domain, the second power domain, and the third power domain. Furthermore, supply monitor 610 receives values corresponding with upper and lower limits for the main power domain, the second power domain, and the third power domain. In addition, supply monitor 610 is configured to generate range signals indicating whether the voltage supply values of the main power domain, the second power domain, and the third power domain are within satisfactory ranges, as defined by the upper and lower limits.

Controller 620 is configured to receive the range signals from supply monitor 610. In addition, controller 620 is configured to receive expected power domain values from second power domain mask register 630. Furthermore, controller 620 is configured to generate error or good signals for the second power domain based on whether the range signals from supply monitor 610 expected power domain values indicate that the power voltages for the second power domains match expected values.

If the range signals and the expected power domain values indicate that the power voltage for the second power domain does not match expected values, controller 620 may be configured to generate an error signal for the second power domain for the electronic system indicating an error in the power voltage of the second power domain. In some embodiments, the error signal provides information indicating various details of the error detected. For example, the error signal may specify the second power domain. In some embodiments, the error signal provides an indication of an over-limit or an under-limit violation for the second power domain. In some embodiments, the error signal causes the integrated circuit to remain in a reset mode.

If the range signals and the expected power domain values indicate that the power voltage for the second power domain does match expected values, controller 620 may be configured to generate a good signal indicating that the power configuration is acceptable. In some embodiments, the good signal causes or is necessary for the integrated circuit to exit a reset mode and enter a use or test mode.

Controller 620 is also configured to receive expected power domain values from third power domain mask register 640, and is configured to generate error or good signals for the third power domain based on whether the range signals from supply monitor 610 and the expected power domain values indicate that the power voltages for the third power domains match expected values.

If the range signals and the expected power domain values indicate that the power voltage for the third power domain does not match expected values, controller 620 may be configured to generate an error signal for the third power domain for the electronic system indicating an error in the power voltage of the third power domain. In some embodiments, the error signal provides information indicating various details of the error detected. For example, the error signal may specify the third power domain. In some embodiments, the error signal provides an indication of an over-limit or an under-limit violation for the third power domain. In some embodiments, the error signal causes the integrated circuit to remain in a reset mode.

If the range signals and the expected power domain values indicate that the power voltage for the third power domain does match expected values, controller 620 may be configured to generate a good signal indicating that the power configuration is acceptable. In some embodiments, the good signal causes or is necessary for the integrated circuit to exit a reset mode and enter a use or test mode.

Second power domain mask register 630 is configured to store expected power domain values for the second power domain.

In some embodiments, second power domain mask register 630 is configured to be written with expected power domain values for the second power domain by controller 620. For example, controller 620 may be configured to receive data indicating power voltage values expected for the second power domain from, for example, the electronic system. In addition, controller 620 may be configured to write data indicating the expected power voltages for the second power domain to the second power domain mask register 630.

In some embodiments, second power domain mask register 630 is configured to be written with expected power domain values for the second power domain from data stored in non-volatile memory 650. For example, controller 620 may be configured to generate a signal causing data to be read from non-volatile memory 650 and written to second power domain mask register 630.

In some embodiments, second power domain mask register 630 is configured to be initialized to a particular state at power up by hardware. For example, a programmable state storage node may be designed to have a capacitance to power and a capacitance to ground. At power up, the capacitance to power being sufficiently greater than the capacitance to ground causes the programmable state storage node to adopt a high value. Conversely, at power up, the capacitance to power being sufficiently less than the capacitance to ground causes the programmable state storage node to adopt a low value.

Third power domain mask register 640 is configured to store expected power domain values for the third power domain.

In some embodiments, third power domain mask register 640 is configured to be written with expected power domain values for the third power domain by controller 620. For example, controller 620 may be configured to receive data indicating power voltage values expected for the third power domain from, for example, the electronic system. In addition, controller 620 may be configured to write data indicating the expected power voltages for the third power domain to the third power domain mask register 640.

In some embodiments, third power domain mask register 640 is configured to be written with expected power domain values for the third power domain from data stored in non-volatile memory 650. For example, controller 620 may be configured to generate a signal causing data to be read from non-volatile memory 650 and written to third power domain mask register 640.

In some embodiments, third power domain mask register 640 is configured to be initialized to a particular state at power up by hardware.

In some embodiments, controller 620 is configured to determine whether the power voltage of the main power domain is within an acceptable range, for example, based on main upper limit signal MUL and Main lower limit signal MLL. If the main upper limit signal MUL indicates that the power voltage of the main power domain is less than an upper limit, and main lower limit signal MLL indicates that the power voltage of the main power domain is greater than a lower limit, controller 620 determines that the power voltage of the main power domain is within an acceptable range.

In response to the main upper limit signal MUL indicating that the power voltage of the main power domain is greater than an upper limit, controller 620 may be configured to generate an error signal, for example, indicating that the power voltage of the main power domain is too high. Similarly, in response to the main lower limit signal MLL indicating that the power voltage of the main power domain is less than a lower limit, controller 620 may be configured to generate an error signal, for example, indicating that the power voltage of the main power domain is too low.

In some embodiments, controller 620 is configured to, in response to determining that the power voltage of the main power domain is within the acceptable range, determine whether the power voltage of the second or third power domain is greater than a lower limit. For example, to determine whether the second or third power domain is greater than the lower limit, controller 620 may be configured to sense the second lower limit signal 2LL or the third lower limit signal 3LL, which respectively indicate whether the power voltages of the second and third power domains are less than their respective limits.

In response to the second lower limit signal 2LL indicating that the power voltage of the second power domain is less than the lower limit of the second power domain, or to the third lower limit signal 3LL indicating that the power voltage of the third power domain is less than the lower limit of the third power domain, controller 620 may be configured to generate an error signal, for example, indicating that the power voltage of the second or third power domain is too low.

In some embodiments, controller 620 is configured to, in response to determining that the power voltage of the second or third power domains is greater than its minimum, cause the second power domain mask register 630 or the third power domain mask register 640 to be loaded with corresponding expected power domain values from non-volatile memory 650.

In some embodiments, controller 620 is also configured to read the expected power domain value data stored in second power domain mask register 630 or third power domain mask register 640.

In some embodiments, controller 620 is configured to, in response to the expected power domain value data indicating that the second power domain or the third power domain is expected to operate with a 3.3 V power voltage, determine whether the power voltage of the second or third power domain is greater than a lower limit. For example, to determine whether the second or third power domain is greater than the lower limit, controller 620 may be configured to sense the second lower limit signal 2LL or the third lower limit signal 3LL, which respectively indicate whether the power voltages of the second and third power domains are less than their respective lower limits.

In response to the second lower limit signal 2LL indicating that the power voltage of the second power domain is less than the lower limit of the second power domain, or to the third lower limit signal 3LL indicating that the power voltage of the third power domain is less than the lower limit of the third power domain, controller 620 may be configured to generate an error signal, for example, indicating that the power voltage of the second or third power domain is too low.

In some embodiments, controller 620 is configured to, in response to determining that the power voltage of the second or third power domains is greater than its minimum, cause or allow the integrated circuit or at least the second or third power domain to operate, for example, by generating a signal allowing the integrated circuit or at least the second or third power domain to exit a reset mode.

In some embodiments, controller 620 is configured to, in response to the expected power domain value data indicating that the second power domain or the third power domain is expected to operate with a 1.8 V power voltage, determine whether the power voltage of the second or third power domain is less than an upper limit. For example, to determine whether the second or third power domain is less than the upper limit, controller 620 may be configured to sense the second upper limit signal 2UL or the third upper limit signal 3UL, which respectively indicate whether the power voltages of the second and third power domains are greater than their respective upper limits.

In response to the second lower limit signal 2UL indicating that the power voltage of the second power domain is greater than the upper limit of the second power domain, or to the third upper limit signal 3UL indicating that the power voltage of the third power domain is greater than the upper limit of the third power domain, controller 620 may be configured to generate an error signal, for example, indicating that the power voltage of the second or third power domain is too high.

In some embodiments, controller 620 is configured to, in response to determining that the power voltage of the second or third power domains is less than its maximum, determine whether the power voltage of the second or third power domain is greater than a lower limit. For example, in response to the second lower limit signal 2LL indicating that the power voltage of the second power domain is less than the lower limit of the second power domain, or to the third lower limit signal 3LL indicating that the power voltage of the third power domain is less than the lower limit of the third power domain, controller 620 may be configured to generate an error signal, for example, indicating that the power voltage of the second or third power domain is too low. In some embodiments, controller 620 is configured to, in response to determining that the power voltage of the second or third power domains is greater than its minimum, cause or allow the integrated circuit or at least the second or third power domain to operate, for example, by generating a signal allowing the integrated circuit or at least the second or third power domain to exit a reset mode.

Figure 7:
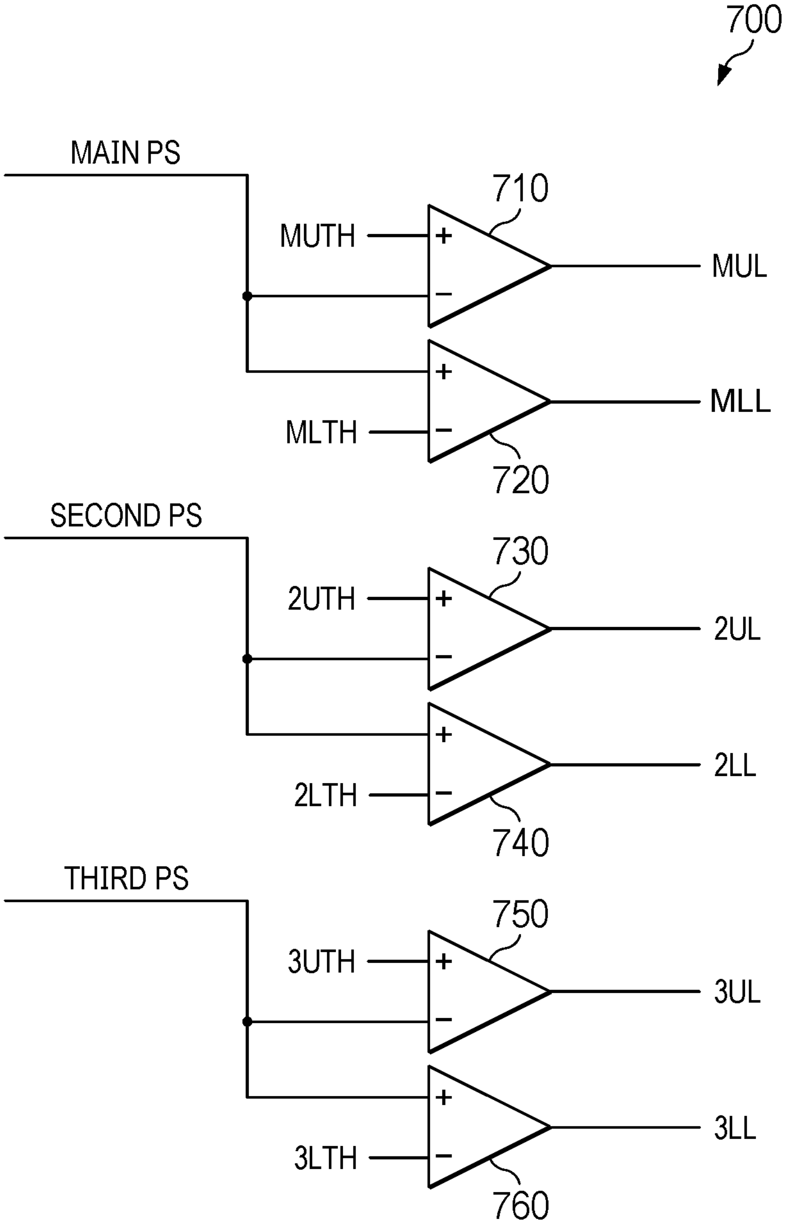
FIG. 7 shows a schematic block diagram of a power supply monitor according to some embodiments.

FIG. 7 shows a schematic block diagram of a power supply monitor 700 according to some embodiments. Power supply monitor 700 includes main supply upper limit comparator 710, main supply lower limit comparator 720, second supply upper limit comparator 730, second supply lower limit comparator 740, third supply upper limit comparator 750, and third supply lower limit comparator 760. Power supply monitor 700 may be used as supply monitor 610 in power status circuit 600.

Main supply upper limit comparator 710 receives the supply voltage MAINPS of the main power supply and the upper limit MUTH for the main power supply. In addition, the main supply upper limit comparator 710 compares the supply voltage MAINPS with the upper limit MUTH, and generates an upper limit signal MUL indicating whether the supply voltage MAINPS is less than the upper limit MUTH.

Main supply lower limit comparator 720 receives the supply voltage MAINPS of the main power supply and the lower limit MLTH for the main power supply. In addition, the main supply lower limit comparator 720 compares the supply voltage MAINPS with the lower limit MLTH, and generates a lower limit signal MLL indicating whether the supply voltage MAINPS is greater than the lower limit MLTH.

Second supply upper limit comparator 730 receives the supply voltage SECONDPS of the second power supply and the upper limit 2UTH for the second power supply. In addition, the second supply upper limit comparator 730 compares the supply voltage SECONDPS with the upper limit 2UTH, and generates an upper limit signal 2UL indicating whether the supply voltage SECONDPS is less than the upper limit 2UTH.

Second supply lower limit comparator 740 receives the supply voltage SECONDPS of the second power supply and the lower limit 2LTH for the second power supply. In addition, the second supply lower limit comparator 740 compares the supply voltage SECONDPS with the lower limit 2LTH, and generates a lower limit signal 2LL indicating whether the supply voltage SECONDPS is greater than the lower limit 2LTH.

Third supply upper limit comparator 750 receives the supply voltage THIRDPS of the third power supply and the upper limit 3UTH for the third power supply. In addition, the third supply upper limit comparator 750 compares the supply voltage THIRDPS with the upper limit 3UTH, and generates an upper limit signal 3UL indicating whether the supply voltage THIRDPS is less than the upper limit 3UTH.

Third supply lower limit comparator 760 receives the supply voltage THIRDPS of the third power supply and the lower limit 3LTH for the third power supply. In addition, the third supply lower limit comparator 760 compares the supply voltage THIRDPS with the lower limit 3LTH, and generates a lower limit signal 3LL indicating whether the supply voltage THIRDPS is greater than the lower limit 3LTH.

Figure 8:
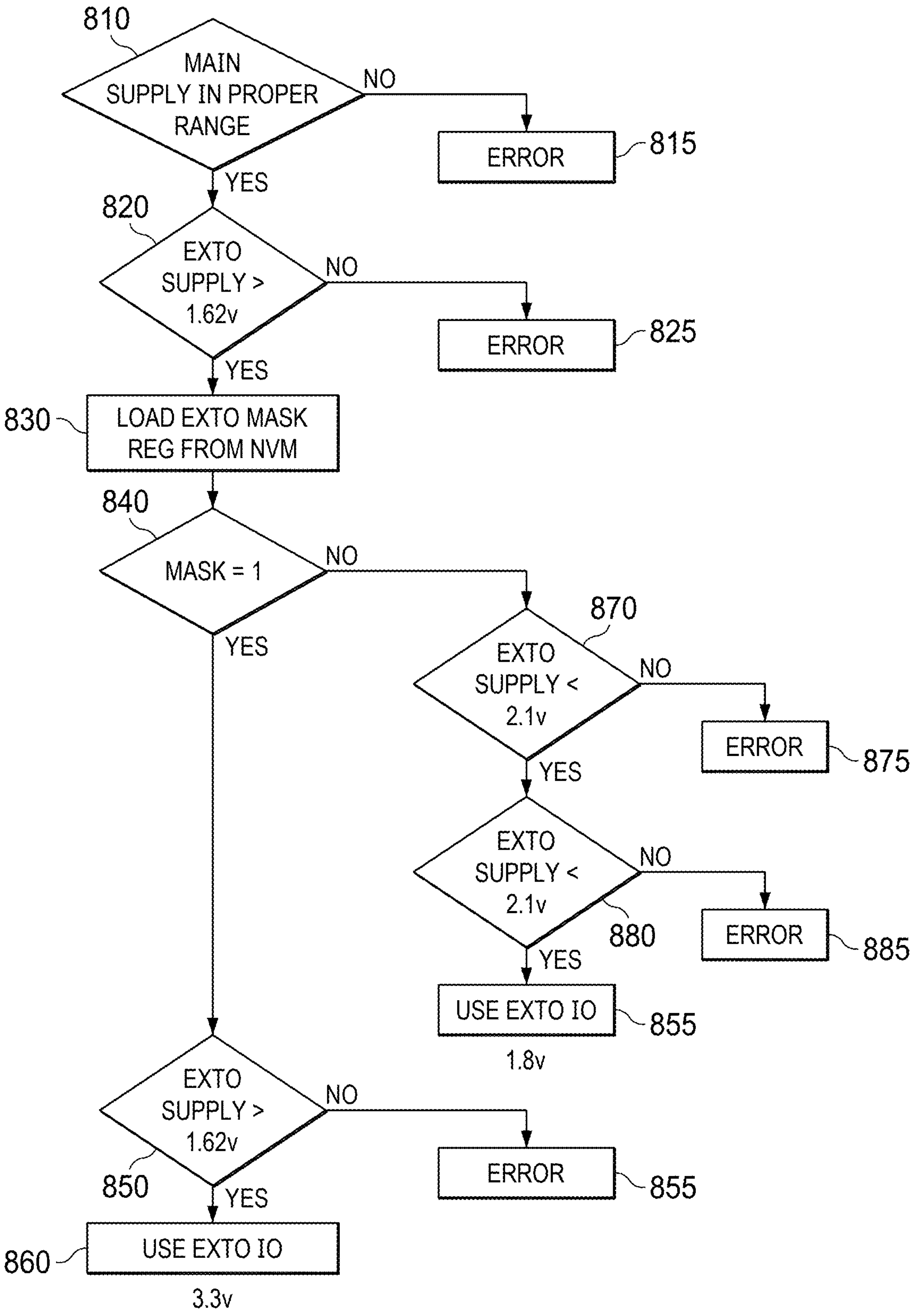
FIG. 8 shows a flowchart diagram of a method of enabling a power domain according to some embodiments.

FIG. 8 shows a flowchart diagram of a method of enabling a power domain 800 according to some embodiments. In some implementations, method 800 may be performed in response to, for example, a start condition, such as a startup, a power up, a restart, a boot up, or a reboot. Method 800 may be performed in response to other stimuli. Method 800 may be performed, for example, by integrated circuit 100, to, for example, enable operation of either or both of the second and third power domains.

At 810, a controller, such as controller 620 determines whether the power voltage of the main power domain is within an acceptable range, for example, based on a main upper limit signal MUL and a main lower limit signal MLL.

In response to the main upper limit signal MUL indicating that the power voltage of the main power domain is greater than an upper limit, at 815, the controller generates an error signal, for example, indicating that the power voltage of the main power domain is too high. Similarly, in response to the main lower limit signal MLL indicating that the power voltage of the main power domain is less than a lower limit, at 815, the controller 620 generates an error signal, for example, indicating that the power voltage of the main power domain is too low.

If the main upper limit signal MUL indicates that the power voltage of the main power domain is less than the upper limit, and main lower limit signal MLL indicates that the power voltage of the main power domain is greater than the lower limit, the controller determines that the power voltage of the main power domain is within an acceptable range.

In response to determining that the power voltage of the main power domain is within the acceptable range, at 820, the controller determines whether the power voltage of the power domain being enabled is greater than a lower limit. For example, to determine whether the power domain being enabled is greater than the lower limit, the controller may sense a lower limit signal, such as second lower limit signal 2LL, or third lower limit signal 3LL, which indicates whether the power voltage of the power domain being enabled is less than its lower limit.

In response to the lower limit signal that the power voltage of the power domain being enabled is less than the lower limit, at 825, the controller may be configured to generate an error signal, for example, indicating that the power voltage of the power domain being enabled is too low.

In response to determining that the power voltage of the power domain being enabled is greater than its minimum, at 830, the controller may cause a mask register, such as second power domain mask register 630 or third power domain mask register 640, to be loaded with corresponding expected power domain values from a non-volatile memory, such as non-volatile memory 650.

At 840, the controller reads the expected power domain value data stored in the mask register.

In response to the expected power domain value data indicating that the power domain to be enabled is expected to operate with a first power voltage value, such as 3.3 V, at 850, the controller determines whether the power voltage of the power domain being enabled is greater than a lower limit. For example, to determine whether the power voltage of the power domain being enabled is greater than the lower limit, the controller may sense the lower limit signal, which indicates whether the power voltage of the power domain to be enabled is less than its lower limit.

In response to the lower limit signal indicating that the power voltage of the power domain to be enabled is less than the lower limit, at 855, the controller may generate an error signal, for example, indicating that the power voltage of the power domain being enabled is too low.

In response to determining that the power voltage of the power domain being enabled is greater than its lower limit, at 860, the controller may cause or allow the integrated circuit or at least the power domain being enabled to operate, for example, by generating a signal allowing the integrated circuit or at least the power domain being enabled to exit a reset mode.

In response to the expected power domain value data indicating that the power domain being enabled is expected to operate with a second power voltage value, less than the first power voltage value, such as 1.8 V, at 870, the controller may determine whether the power voltage of the power domain being enabled is less than an upper limit. For example, to determine whether the power domain being enabled is less than the upper limit, the controller may sense an upper limit signal, such as second upper limit signal 2UL or third upper limit signal 3UL, which indicates whether the power voltages of the power domain being enabled is greater than its upper limit.

In response to the lower limit signal indicating that the power voltage of the power domain being enabled is greater than the upper limit, the controller may generate an error signal, for example, indicating that the power voltage of the power domain being enabled is too high.

In response to determining that the power voltage of the power domain being enabled is less than its upper limit, at 880, the controller may determine whether the power voltage of the power domain being enabled is greater than a lower limit. For example, in response to a lower limit signal, such as second lower limit signal 2LL or third lower limit signal 3LL, indicating that the power voltage of the power domain being enabled is less than the lower limit, the controller may generate an error signal, for example, indicating that the power voltage of the power domain being enabled is too low.

In response to determining that the power voltage of the power domain being enabled is greater than its minimum, at 890, the controller may cause or allow the integrated circuit or at least the power domain being enabled to operate, for example, by generating a signal allowing the integrated circuit or at least the power domain being enabled to exit a reset mode.

Examples of the present invention are summarized here. Other examples can also be understood from the entirety of the specification and the claims.

Example 1. Another embodiment is an electronic circuit, including a plurality of power voltage monitoring circuits configured to monitor a main power voltage provided to a first circuit configured to operate in a main power domain, generate a main power domain monitor signal based on the main power voltage, monitor a second power voltage provided to a second circuit configured to operate in a second power domain, and generate a second power domain monitor signal based on the second power voltage; a non-volatile memory configured to store data indicating an expected power domain value for the second power domain; a mask register configured to receive and store data from the non-volatile memory indicating the expected power domain value for the second power domain; and a controller configured to generate a power status signal for the second power domain based on data of the mask register, the main power domain monitor signal, and the second power domain monitor signal.

Example 2. The electronic circuit of example 1, where the controller is configured to cause the mask register to receive and store the data from the non-volatile memory in response to determining that the main power voltage is within a main power voltage range.

Example 3. The electronic circuit of any of the preceding examples, where the controller is configured to cause the mask register to receive and store the data from the non-volatile memory in response to determining that the second power voltage is within a second power voltage range.

Example 4. The electronic circuit of any of the preceding examples, where the mask register is initialized to an initial state prior to receiving the data from the non-volatile memory.

Example 5. The electronic circuit of any of the preceding examples, where the power voltage monitoring circuits include first and second comparators configured to respectively compare the main power voltage to first and second threshold voltage values.

Example 6. The electronic circuit of any of the preceding examples, where the power voltage monitoring circuits include third and fourth comparators configured to respectively compare the second power voltage to third and fourth threshold voltage values.

Example 7. The electronic circuit of any of the preceding examples, where the second power voltage is selectably equal to either the main power voltage or equal to a voltage less than the main power voltage.

Example 8. The electronic circuit of any of the preceding examples, where the power status signal for the second power domain is configured to cause or allow the second power domain to operate.

Example 9. The electronic circuit of any of the preceding examples, further including a third circuit configured to operate in a third power domain having a third power voltage, where the non-volatile memory is configured to store data indicating an expected power status for the third power domain, where the mask register is configured to receive and store data from the non-volatile memory indicating the expected power status for the third power domain, where the power voltage monitoring circuits are configured to additionally monitor the third power voltage, and to generate a third power domain monitor signal based on the third power voltage, and where the controller is configured to generate a power status signal for the third power domain based on the data of the mask register, the main power domain monitor signal, and the third power domain monitor signal.

Example 10. The electronic circuit of any of the preceding examples, where the power status signal for the third power domain is configured to cause or allow the third power domain to operate.

Example 11. Another embodiment is a system, including a main power source, configured to generate a main power voltage; a second power source, configured to generate a second power voltage; and an electronic circuit, including a plurality of power voltage monitoring circuits configured to monitor the main power voltage, the main power voltage being provided to a first circuit configured to operate in a main power domain, generate a main power domain monitor signal based on the main power voltage, monitor the second power voltage, the second power voltage being provided to a second circuit configured to operate in a second power domain, and generate a second power domain monitor signal based on the second power voltage; a non-volatile memory configured to store data indicating an expected power domain value for the second power domain; a mask register configured to receive and store data from the non-volatile memory indicating the expected power domain value for the second power domain; and a controller configured to generate a power status signal for the second power domain based on data of the mask register, the main power domain monitor signal, and the second power domain monitor signal.

Example 12. The system of example 11, where the controller is configured to cause the mask register to receive and store the data from the non-volatile memory in response to determining that the main power voltage is within a main power voltage range, and the second power voltage is within a second power voltage range.

Example 13. The system of any of the preceding examples, where the power voltage monitoring circuits include first and second comparators configured to respectively compare the main power voltage to first and second threshold voltage values; and third and fourth comparators configured to respectively compare the second power voltage to third and fourth threshold voltage values.

Example 14. The system of any of the preceding examples, where the second power voltage is selectably equal to either the main power voltage or equal to a voltage less than the main power voltage.

Example 15. The system of any of the preceding examples, where the power status signal for the second power domain is configured to cause or allow the second power domain to operate.

Example 16. The system of any of the preceding examples, the electronic circuit further including a third circuit configured to operate in a third power domain having a third power voltage, where the non-volatile memory is configured to store data indicating an expected power status for the third power domain, where the mask register is configured to receive and store data from the non-volatile memory indicating the expected power status for the third power domain, where the power voltage monitoring circuits are configured to additionally monitor the third power voltage, and to generate a third power domain monitor signal based on the third power voltage, and where the controller is configured to generate a power status signal for the third power domain based on the data of the mask register, the main power domain monitor signal, and the third power domain monitor signal.

Example 17. The system of any of the preceding examples, where the power status signal for the third power domain is configured to cause or allow the third power domain to operate.

Example 18. Another embodiment is a method of operating a system, the method including in response to data indicating that a first power domain is expected to operate with a first power voltage value determining whether a first power voltage of the first power domain is greater than a predetermined lower limit, and, in response to the first power voltage being greater than the lower limit, generating a signal allowing the first power domain to exit a reset mode; and in response to data indicating that the first power domain is expected to operate with a second power voltage value less than the first power voltage value determining whether the first power voltage of the first power domain is less than a predetermined upper limit, in response to the first power voltage being less than the upper limit, determining whether the first power voltage of the first power domain is greater than the lower limit, and, in response to the first power voltage being greater than the lower limit, generating a signal allowing the first power domain to exit the reset mode.

Example 19. The method of any of the preceding examples, further including, in response to the first power voltage being less than the lower limit, generating a signal preventing the first power domain from exiting the reset mode.

Example 20. The method of any of the preceding examples, further including, in response to the first power voltage being less than the lower limit, loading data from a non-volatile memory to a mask register, the data indicating the first power voltage value.

What is claimed is:

1. An electronic circuit, comprising:

a plurality of power voltage monitoring circuits configured to monitor a main power voltage provided to a first circuit configured to operate in a main power domain, generate a main power domain monitor signal based on the main power voltage, monitor a second power voltage provided to a second circuit configured to operate in a second power domain, and generate a second power domain monitor signal based on the second power voltage;

a non-volatile memory configured to store data indicating an expected power domain value for the second power domain;

a mask register configured to receive and store data from the non-volatile memory indicating the expected power domain value for the second power domain; and a controller configured to generate a power status signal for the second power domain based on the data of the mask register, the main power domain monitor signal, and the second power domain monitor signal.

2. The electronic circuit of claim 1, wherein the controller is configured to cause the mask register to receive and store the data from the non-volatile memory in response to determining that the main power voltage is within a main power voltage range.

3. The electronic circuit of claim 2, wherein the controller is configured to cause the mask register to receive and store the data from the non-volatile memory in response to determining that the second power voltage is within a second power voltage range.

4. The electronic circuit of claim 1, wherein the mask register is initialized to an initial state prior to receiving the data from the non-volatile memory.

5. The electronic circuit of claim 1, wherein the power voltage monitoring circuits comprise first and second comparators configured to respectively compare the main power voltage to first and second threshold voltage values.

6. The electronic circuit of claim 5, wherein the power voltage monitoring circuits comprise third and fourth comparators configured to respectively compare the second power voltage to third and fourth threshold voltage values.

7. The electronic circuit of claim 1, wherein the second power voltage is selectably equal to either the main power voltage or a voltage less than the main power voltage.

8. The electronic circuit of claim 1, wherein the power status signal for the second power domain is configured to cause or allow the second power domain to operate.

9. The electronic circuit of claim 1, further comprising:

a third circuit configured to operate in a third power domain having a third power voltage, wherein the non-volatile memory is configured to store data indicating an expected power status for the third power domain, wherein the mask register is configured to receive and store data from the non-volatile memory indicating the expected power status for the third power domain, wherein the power voltage monitoring circuits are configured to additionally monitor the third power voltage, and to generate a third power domain monitor signal based on the third power voltage, and wherein the controller is configured to generate a power status signal for the third power domain based on the data of the mask register, the main power domain monitor signal, and the third power domain monitor signal.

10. The electronic circuit of claim 9, wherein the power status signal for the third power domain is configured to cause or allow the third power domain to operate.

11. A system, comprising:

a main power source, configured to generate a main power voltage;

a second power source, configured to generate a second power voltage; and an electronic circuit, comprising:

a plurality of power voltage monitoring circuits configured to monitor the main power voltage, the main power voltage being provided to a first circuit configured to operate in a main power domain, generate a main power domain monitor signal based on the main power voltage, monitor the second power voltage, the second power voltage being provided to a second circuit configured to operate in a second power domain, and generate a second power domain monitor signal based on the second power voltage;

a non-volatile memory configured to store data indicating an expected power domain value for the second power domain;

a mask register configured to receive and store data from the non-volatile memory indicating the expected power domain value for the second power domain; and a controller configured to generate a power status signal for the second power domain based on the data of the mask register, the main power domain monitor signal, and the second power domain monitor signal.

12. The system of claim 11, wherein the controller is configured to cause the mask register to receive and store the data from the non-volatile memory in response to determining that:

the main power voltage is within a main power voltage range, and the second power voltage is within a second power voltage range.

13. The system of claim 11, wherein the power voltage monitoring circuits comprise:

first and second comparators configured to respectively compare the main power voltage to first and second threshold voltage values; and third and fourth comparators configured to respectively compare the second power voltage to third and fourth threshold voltage values.

14. The system of claim 11, wherein the second power voltage is selectably equal to either the main power voltage or a voltage less than the main power voltage.

15. The system of claim 11, wherein the power status signal for the second power domain is configured to cause or allow the second power domain to operate.

16. The system of claim 11, the electronic circuit further comprising:

a third circuit configured to operate in a third power domain having a third power voltage, wherein the non-volatile memory is configured to store data indicating an expected power status for the third power domain, wherein the mask register is configured to receive and store data from the non-volatile memory indicating the expected power status for the third power domain, wherein the power voltage monitoring circuits are configured to additionally monitor the third power voltage, and to generate a third power domain monitor signal based on the third power voltage, and wherein the controller is configured to generate a power status signal for the third power domain based on the data of the mask register, the main power domain monitor signal, and the third power domain monitor signal.

17. The system of claim 16, wherein the power status signal for the third power domain is configured to cause or allow the third power domain to operate.

18. A system, comprising:

a main power source configured to generate a main power voltage;

a second power source configured to generate a second power voltage;

an integrated circuit configured to receive the main power voltage at a first power domain and the second power voltage at a second power domain, the integrated circuit comprising:

a plurality of power voltage monitoring circuits configured to monitor the main power voltage and generate a main power domain monitor signal, and monitor the second power voltage and generate a second power domain monitor signal;

a non-volatile memory configured to store data indicating an expected power voltage value for the second power domain;

a mask register configured to be loaded with the data from the non-volatile memory; and a controller configured to:

in response to the main power domain monitor signal indicating that the main power voltage is within an acceptable range, and the second power domain monitor signal indicating that the second power voltage is above a lower limit threshold, cause the mask register to be loaded with the data from the non-volatile memory; and generate a power status signal for the second power domain based on the data loaded from the non-volatile memory into the mask register, the main power domain monitor signal, and the second power domain monitor signal, wherein the integrated circuit determines the expected power voltage value for the second power domain without a dedicated external package pin for communicating the expected power voltage value.

19. The system of claim 18, wherein the controller is further configured to, in response to the second power domain monitor signal indicating that the second power voltage is below the lower limit threshold, generate an error signal indicating that the second power voltage is below the lower limit threshold.

20. The system of claim 18, wherein the power status signal is configured to cause the second power domain to exit a reset mode.

* * * * *